(12) United States Patent
Bando

(10) Patent No.: US 9,627,910 B2
(45) Date of Patent: Apr. 18, 2017

(54) PEAK-CUT CONTROL DEVICE

(71) Applicant: JAPAN WIND DEVELOPMENT CO., LTD., Tokyo (JP)

(72) Inventor: Matsuo Bando, Tokyo (JP)

(73) Assignee: JAPAN WIND DEVELOPMENT CO., LTD., Tokyo (JP)

( * ) Notice: Subject to any disclaimer, the term of this patent is extended or adjusted under 35 U.S.C. 154(b) by 507 days.

(21) Appl. No.: 14/206,975

(22) Filed: Mar. 12, 2014

(65) Prior Publication Data

US 2014/0191577 A1 Jul. 10, 2014

Related U.S. Application Data

(63) Continuation of application No. PCT/JP2011/070779, filed on Sep. 13, 2011.

(51) Int. Cl.
H02J 7/00 (2006.01)
H02J 3/38 (2006.01)
H02J 3/00 (2006.01)

(52) U.S. Cl.
CPC ............ *H02J 7/0068* (2013.01); *H02J 3/382* (2013.01); *H02J 2003/003* (2013.01); *Y04S 10/54* (2013.01); *Y10T 307/527* (2015.04)

(58) Field of Classification Search
CPC .................................................. H02J 7/0068
USPC ......................................................... 307/48
See application file for complete search history.

(56) References Cited

U.S. PATENT DOCUMENTS

2008/0179887 A1 7/2008 Kawazoe et al.
2012/0187913 A1 7/2012 Abe et al.

FOREIGN PATENT DOCUMENTS

| JP | 2004-062254 A | 2/2004 |
| JP | 2008-141918 A | 6/2008 |
| JP | 2008-182859 A | 8/2008 |
| JP | 2009/065787 A | 3/2009 |
| JP | 2009-284586 A | 12/2009 |
| WO | 2011/052314 A1 | 5/2011 |

OTHER PUBLICATIONS

Extended European Search Report issued in corresponding European Application No. 11872424.4 dated Apr. 22, 2015 (8 pages).
(Continued)

*Primary Examiner* — Joseph Chang
(74) *Attorney, Agent, or Firm* — Osha Liang LLP

(57) ABSTRACT

A peak-cut control device is provided with a storage battery having a power generation device and a storage battery for charging/discharging a part of power generated by the power generation device. The peak-cut control device includes a difference power calculating section that calculates differential power between a planned power generation amount in the power generation device determined based on a temporary peak cut amount and a demand prediction power amount that predicts a power demand for each predetermined time, and also includes a peak-cut amount calculating section that compares the calculated differential power with chargeable power or dischargeable power per unit time of the storage battery every predetermined time and simulating charge/discharge of the difference power to/from the storage battery and an increase/decrease in the temporary peak-cut amount.

3 Claims, 5 Drawing Sheets

(56) References Cited

OTHER PUBLICATIONS

Ruvini Kankanamalage et al: "Usage of storage for optimal exploitation of transfer capacity: A predictive control approach", Power and Energy Society General Meeting, 2011 IEEE, IEEE, Jul. 21, 2011 (Jul. 24, 2011), pp. 1-8, XP032055430, DOI: 10.1109/PES.2011.6039389 ISBN: 978-1-4577-1000-1.
International Search Report issued in PCT/JP2011/070779 mailed on Dec. 20, 2011 (2 pages).
Patent Abstracts of Japan for JP2009-284586, publication date Dec. 3, 2009. (1 page).
Patent Abstracts of Japan for JP2004-062254, publication date Feb. 26, 2004. (1 page).
Patent Abstracts of Japan for JP2008-141918, publication date Jun. 19, 2008. (1 page).

PEAK-CUT CONTROL DEVICE

TECHNICAL FIELD

The present invention generally relates to a peak-cut control device and more particularly to a peak-cut control device in a natural energy power generation system with a storage battery.

BACKGROUND ART

Although solar power generation, wind power generation and the like have such an advantage as to use clean natural energy, they are influenced by a natural condition such as solar radiation or wind state so that it is hard to ensure a stable power generation amount. The unstable power is cannot be exactly transmitted to a power network. For this reason, there is used a technique in which a power generation device is provided with a storage battery and a part of power generation outputs fluctuating at any time depending on a natural condition is charged/discharged to/from a storage battery to stabilize the output and transmit power to a power network.

Moreover, there is also used a technique for charging a part of power obtained by power generation to a storage battery at night (at time of off-peak) that a power demand is small and discharging the power during a daytime (in a peak time period) in which the power demand is great, thereby carrying out peak cut (see Patent Documents 1 and 2, for example).
Patent Document 1: Japanese Laid-Open Patent Publication No. 2009-284586
Patent Document 2: Japanese Laid-Open Patent Publication No. 2004-62254

Referring to Patent Document 1, a difference between a power demand prediction and a purchased power specified value is calculated every time period and is set to be peak power if the demand prediction is greater than the purchased power specified value. The peak power for each time period is integrated to calculate a total amount of the peak power. On the other hand, it is decided whether the total amount of the peak power is larger than the latest charging power amount measured by a charger/discharger or not. If the total amount of the peak power is larger than the latest charging power amount, it is planned to charge power to a storage battery in order to ensure a necessary power storage amount for peak cut before a time period where the peak power is generated. Consequently, the necessary power amount for carrying out the peak cut can be supplied from the storage battery in the time period for the execution of the peak cut.

Referring to Patent Document 2, moreover, a peak-cut position is assumed based on a consumed power pattern which is previously obtained and a rated power generation output of a power generation device is assumed based thereon. A cost reduction effect or an advantage effect is acquired by utilizing a power generation system through a predetermined operation using maximum power of consumed power patterns and a peak-cut position, power rate data, price data of the power generation system, use period data, equipment maintenance, repair cost data and the like.

A value of the rated power generation output which is assumed is changed several times in order to maximize the cost reduction effect or the advantage effect within a range of the assumed peak-cut position. Furthermore, the assumed peak-cut position is changed several times to obtain a rated power generation output and a rated battery capacity which are suitable therefor and to determine a peak-cut position in which the cost reduction effect or the advantage effect is maximized. Thus, it is possible to select the most suitable power generation system for a load to be used by a power consumer or a load for supplying power by a power supplier.

As mentioned above, in Patent Documents 1 and 2, the power demand prediction is performed in advance to obtain the peak-cut amount. In the Patent Document 1, however, the peak-cut amount is obtained based on the difference between the demand prediction and the purchased power specified value. In the Patent Document 2, moreover, the peak-cut amount for the maximization of the cost reduction effect or the advantage effect is acquired based on the consumed power pattern of the demand prediction.

In some cases in which the peak-cut amount is acquired based on the purchased power specified amount in the Patent Document 1 or the cost reduction effect or the advantage effect in the Patent Document 2, however, the peak cut cannot be sufficiently carried out by simple charge/discharge of the storage battery. The peak-cut amount is not acquired in consideration of a free space or a power storage amount of the storage battery which is changed every moment. For this reason, the free space is insufficient so that excessive generated power cannot be sufficiently stored in the storage battery or the power storage amount is insufficient so that the discharge from the storage battery cannot be sufficiently carried out.

In the case in which the charge/discharge of the storage battery cannot cover the execution of the peak cut as described above, a power generator should be controlled to regulate a power generation amount. However, an apparatus accompanied by a rotating machine, for example, a wind power generator has a peculiar difficulty of control and a control delay through inertia which necessarily occur over the rotating machine. For this reason, it is difficult to give a rapid response in peak-cut control for committing a regulation source for a power demand which is changed every moment to the wind power generator of the rotating machine.

SUMMARY OF THE INVENTION

One or more embodiments of the present invention enable execution of peak-cut control of power without depending on a rotating machine of a wind power generator as much as possible by making the most of a storage battery.

In one or more embodiments of the present invention, there is obtained difference power between a planned power generation amount determined based on a temporary peak-cut amount and a demand prediction power amount predicting a power demand for each predetermined time, the obtained difference power is compared with chargeable power or dischargeable power per unit time of a storage battery every predetermined time to simulate charge/discharge of the storage battery and an increase/decrease in the temporary peak-cut amount, thereby obtaining a peak-cut amount for each predetermined time successively.

According to one or more embodiments of the present invention, the peak-cut amount is acquired in consideration of the chargeable power or the dischargeable power per unit time of the storage battery. Therefore, for example, it is possible to obtain a peak-cut amount which makes the most of the ability of the storage battery. Consequently, it is possible to control the generated power which is excessive or insufficient for an actual demand through the charge/discharge of the storage battery by making the most of the ability of the storage battery in an actual operation after a simulation. Thus, for example, it is possible to carry out the peak-cut control of power without depending on a rotating machine of a window power generator as much as possible.

DETAILED DESCRIPTION OF EMBODIMENTS OF THE INVENTION

Figure 1:
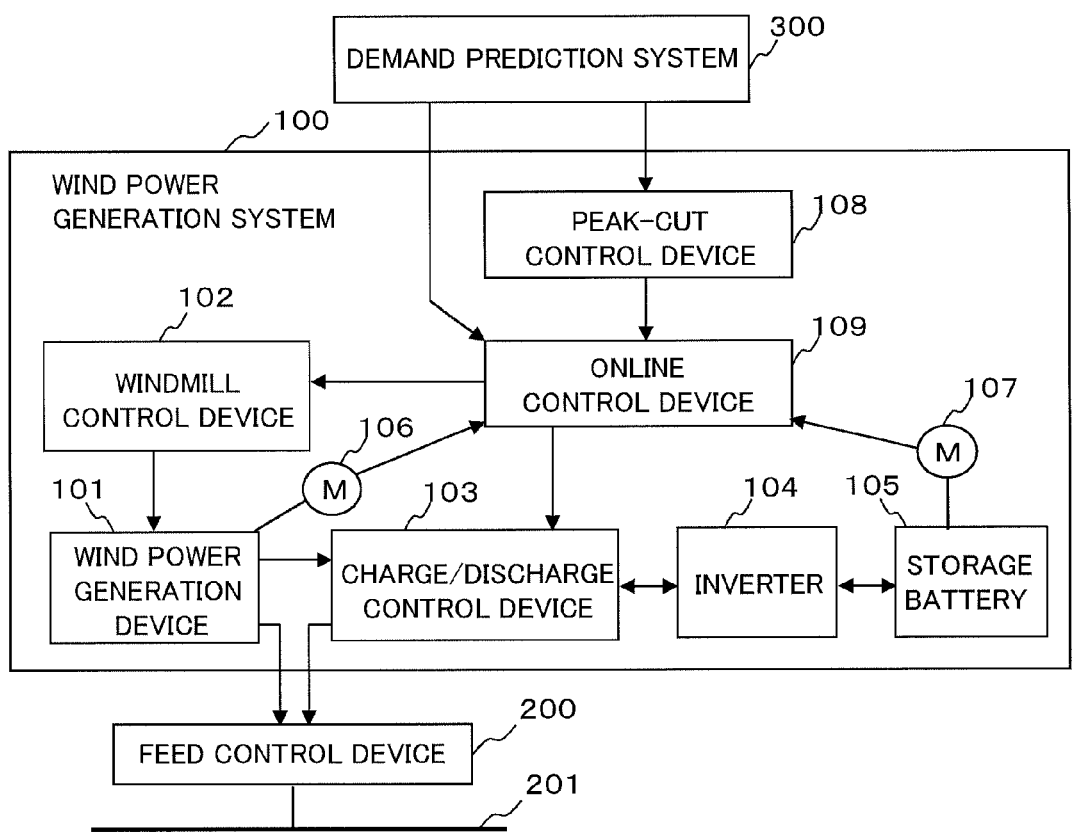
FIG. 1 is a diagram showing an example of a structure of a natural energy power generation system with a storage battery which includes a peak-cut control device according to one or more embodiments.

Embodiments of the present invention will be described below with reference to the drawings. FIG. 1 is a diagram showing an example of a structure of a natural energy power generation system with a storage battery which has a peak-cut control device according to one or more embodiments of the present invention. The natural energy power generation system with a storage battery according to one or more embodiments of the present invention includes a natural energy power generation device and a storage battery for charging/discharging a part of power generated by the natural energy power generation device. In one or more embodiments of the present invention, a wind power generation system is used as an example of the natural energy power generation system.

As shown in FIG. 1, a wind power generation system 100 according to one or more embodiments of the present invention includes a wind power generation device 101 (corresponding to a natural energy power generation device), a windmill control device 102, a charging/discharging control device 103, an inverter 104, a storage battery 105, a power generation amount meter 106, a charging amount meter 107, a peak-cut control device 108 and an online control device 109. Moreover, the wind power generation system 100 according to one or more embodiments of the present invention is linked to a system 201 of an electric power company through a feed control device 200. Moreover, the wind power generation system 100 according to one or more embodiments of the present invention is connected to a demand prediction system 300.

The wind power generation device 101 is driven by wind power and serves to generate power to be supplied to the system 201. Specifically, the wind power generation device 101 has a structure in which a tower portion is built on a base and a propeller type windmill is provided in an upper part of the tower portion. A blade to be a vane (wing) part of the propeller type windmill is attached to a rotating shaft through a hub and is configured rotatably with the rotating shaft upon receipt of wind. A power generator is connected to the rotating shaft and power generated by the power generator is output to an outside of the wind power generation device 101 via a power cable.

The windmill control device 102 serves to control rotation of a windmill (a rotating machine) provided in the wind power generation device 101. The windmill control device 102 controls the rotation of the windmill, thereby controlling a power generation amount in the wind power generation device 101. The power generated in the wind power generation device 101 is supplied to the storage battery 105 through the charging/discharging control device 103 and the inverter 104 or is transmitted to the system 201 through the feed control device 200.

The storage battery 105 serves to store a part of the power generated by the wind power generation device 101 by charging/discharging. The charging/discharging control device 103 serves to control the charge/discharge of the storage battery 105. If the power generation amount in the wind power generation device 101 is larger than a demand power amount obtained by the demand prediction system 300, basically, the charging/discharging control device 103 controls to charge extra power thereof to the storage battery 105. To the contrary, if the power generation amount in the wind power generation device 101 is smaller than the demand power amount, the charging/discharging control device 103 controls to carry out the discharge from the storage battery 105 in order to compensate for insufficient power thereof.

The inverter 104 serves to carry out DC/AC conversion for power. Specifically, the inverter 104 converts AC power supplied from the charging/discharging control device 103 in the charge into DC power and supplies the DC power to the storage battery 105. Moreover, the inverter 104 converts the DC power supplied from the storage battery 105 in the discharge into the AC power and supplies the AC power to the charging/discharging control device 103.

The feed control device 200 uses the power generated from the wind power generation device 101 and the power discharged from the storage battery 105 by the control of the charging/discharging control device 103, thereby controlling the power to be fed to the system 201. For example, the feed control device 200 carries out control to supply, to the system 201, power obtained by synthesizing a power generation amount of the wind power generation device 101 and a discharge amount from the storage battery 105. By carrying out the control, it is possible to suppress a fluctuation in the output power of the wind power generation device 101 seen from the system 201, thereby smoothing the power to be supplied to the system 201 to be constant.

The demand prediction system 300 serves to predict a power demand for each predetermined time. In execution of a simulation for acquiring a peak-cut amount, the demand prediction system 300 predicts a power demand for a next day every predetermined time (for example, one minute) and supplies, to the peak-cut control device 108, a demand prediction power amount for one day obtained by the prediction, for instance.

In execution of online control which actually operates the wind power generation system 100 by using the peak-cut amount obtained by the simulation, moreover, the demand prediction system 300 predicts a power demand for that day every predetermined time (for example, one second) and successively supplies a demand prediction power amount obtained by the prediction to the online control device 109. The prediction of the power demand can be carried out by applying a known technique. Herein, detailed description thereof will be omitted.

The power generation amount meter 106 successively detects an actual generated power amount from the wind power generation device 101 and gives the online control device 109 a notice of the detected power generation amount. The charging amount meter 107 successively detects a charging power amount (a power storage amount) of the storage battery 105 and gives a notice of the detected charging power amount to the online control device 109.

The peak-cut control device 108 acquires, by a simulation, a peak-cut amount corresponding to a power demand and information about the storage battery 105 (which will be described later in detail). In other words, the peak-cut control device 108 executes the simulation by using a demand prediction power amount for a next day which is obtained by the demand prediction system 300 and the information about the storage battery 105, thereby acquiring a proper peak-cut amount corresponding to a power demand (a prediction value) for a next day, a state of the storage battery 105 and the like.

When actually operating the wind power generation system 100 to execute the online control on a day after the execution of the simulation through the peak-cut control device 108, the online control device 109 executes peak cut by controlling the charge/discharge of the storage battery 105 using a peak-cut amount obtained on a previous day and a demand prediction power amount for that day which is acquired by the demand prediction system 300.

Specifically, the online control device 109 sets, as a planned power generation amount for that day, a peak-cut amount obtained by a simulation on a previous day by the peak-cut control device 108. If a power generation amount in the wind power generation device 101 in accordance with a power generation plan based on the planned Power generation amount is larger than the demand power amount obtained by the demand prediction system 300, the charging/discharging control device 103 is controlled to charge extra power thereof to the storage battery 105. To the contrary, if the power generation amount in the wind power generation device 101 is smaller than the demand power amount, the charging/discharging control device 103 is controlled to carryout the discharge from the storage battery 105 in order to compensate for insufficient power thereof.

The charging power amount (the power storage amount) of the storage battery 105 is detected by the charging amount meter 107 and a notice of the detected charging power amount is given to the online control device 109. If the online control device 109 decides that the charging power amount is excessive or insufficient so that the charge/discharge of the storage battery 105 cannot be carried out based on the charging power amount of the storage battery 105 which is given from the charging amount meter 107, it controls the power generation amount in the wind power generation device 101 through the windmill control device 102.

Figure 2:
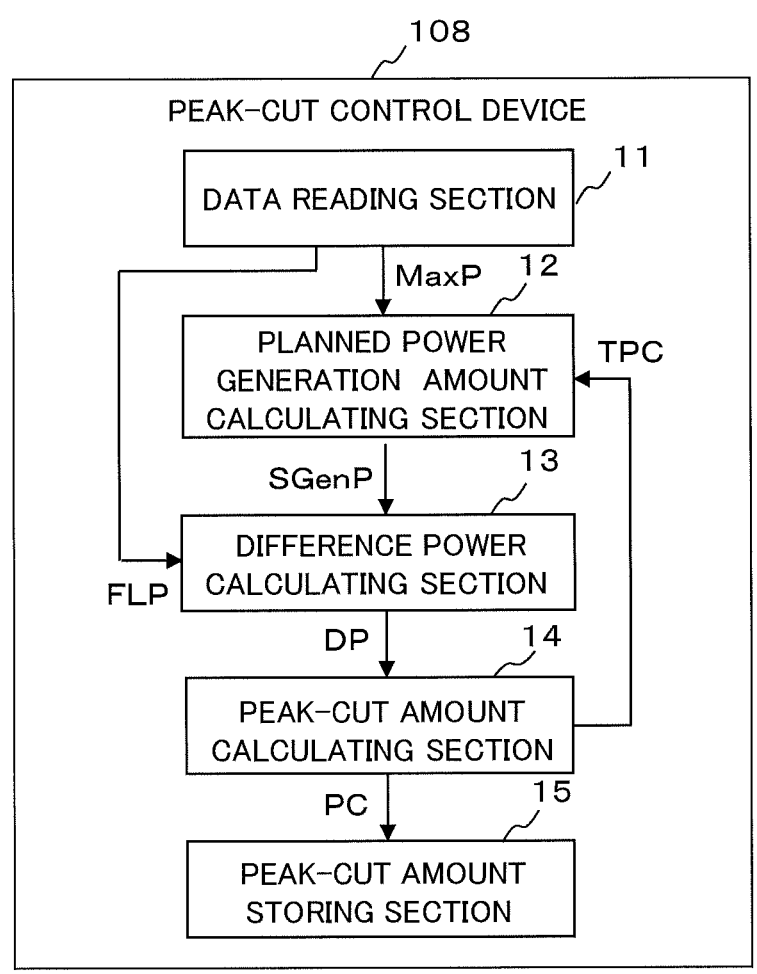
FIG. 2 is a diagram showing an example of a functional structure of the peak-cut control device according to one or more embodiments.

FIG. 2 is a diagram showing an example of a functional structure of the peak-cut control device 108 according to one or more embodiments of the present invention. As shown in FIG. 2, the peak-cut control device 108 according to one or more embodiments of the present invention includes, as a functional structure thereof, a data reading section 11, a planned power generation amount calculating section 12, a difference power calculating section 13, a peak-cut amount calculating section 14 and a peak-cut amount storing section 15.

The data reading section 11 reads, from the demand prediction system 300, demand prediction data representing a demand prediction power amount for one day which is obtained by predicting a power demand for a next day every predetermined time (for example, every minute).

The planned power generation amount calculating section 12 calculates a planned power generation amount SGenP in the wind power generation device 101 based on the demand prediction data read by the data reading section 11 and a temporary peak-cut amount TPC which is set temporarily by the peak-cut amount calculating section 14. Specifically, a maximum value MaxP of consumed power which is predicted on a next day based on the demand prediction data is specified and the temporary peak-cut amount TPC is subtracted from the maximum value MaxP to obtain a planned power generation amount SGenP for each predetermined time (SGenP=MaxP−TPC).

The difference power calculating section 13 obtains difference power DP between the planned power generation amount SGenP for each predetermined time which is acquired by the planned power generation amount calculating section 12 and a demand prediction power amount FLP predicting a power demand for each predetermined time (DP=SGenP−FLP). There is utilized the demand prediction power amount FLP which is read as demand prediction data from the demand prediction system 300 by the data reading section 11.

The peak-cut amount calculating section 14 compares the difference power DP obtained by the difference power calculating section 13 with chargeable power PCP or dischargeable power PDP of the storage battery 105 every predetermined time, thereby simulating the charge/discharge of the storage battery 105 and an increase/decrease in the temporary peak-cut amount TPC to obtain a peak-cut amount PC every predetermined time. Then, the peak-cut amount calculating section 14 records, in the peak-cut amount storing section 15, the peak-cut amount PC for each predetermined time which is obtained.

The chargeable power PCP indicates power (an instantaneous value) per unit time which can be charged to the storage battery 105. This is a different concept from the charging power amount (storage power amount) RC of the storage battery 105. The charging power amount RC indicates an amount of power which is actually stored in the storage battery 105. For example, in the case in which a full capacity of the storage battery 105 is 20,000 kWh (for example, there is set a rating that power of 2,000 kW per unit time can be discharged for 10 hours), the charging power amount RC is 10,000 kWh when power is stored till a half of the full capacity.

On the other hand, the value of 2,000 kW represents the chargeable power PCP. Even if the full capacity of the storage battery 105 is 20,000 kWh, the chargeable power PCP is different when the rating differs. For example, in the case of the rating that power of 1,000 kW per unit time can be discharged for 20 hours, the chargeable power PCP is 1,000 kW. The dischargeable power PDP is also the same. In other words, the dischargeable power PDP represents power (an instantaneous value) per unit time which can be discharged from the storage battery 105.

The peak-cut amount calculating section 14 simulates an increase in the charging power amount RC and an increase in the temporary peak-cut amount TPC through the charge of the storage battery 105 in such a manner that the temporary peak-cut amount TPC is maximized within a range in which the difference power DP obtained by the difference power calculating section 13 is smaller than the chargeable power PCP. Moreover, the peak-cut amount calculating section 14 simulates a decrease in the charging power amount RC and a decrease in the temporary peak-cut amount TPC through the discharge of the storage battery 105 in such a manner that the temporary peak-cut amount TPC is minimized within a range in which the difference power DP is smaller than the dischargeable power PDP.

The peak-cut amount calculating section 14 determines, as the peak-cut amount PC, the temporary peak-cut amount TPC obtained finally by the simulation. The peak-cut amount calculating section 14 repetitively performs the simulation plural times on a unit of division of one day every predetermined time, thereby obtaining the peak-cut amount PC for each predetermined time corresponding to one day.

It is also possible to consider a charging limit CLMh and a discharging limit DLMh in the storage battery 105 in addition to the chargeable power PCP and the dischargeable power PDP in the storage battery 105 when acquiring the peak-cut amount PC by the simulation. The charging limit CLMh represents a state in which the storage battery 105 reaches a charging end (a state in which the charging power amount RC is 100%). Moreover, the discharging limit DLMh represents a state in which the storage battery 105 reaches a discharging end (a state in which the charging power amount RC is 0%). A margin of approximately ±15% may be taken to set a state of the charging power amount RC of 85% as the charging limit CLMh and to set a state of the discharging power amount RC of 15% as the discharging limit DLMh.

In the case in which the charging limit CLMh and the discharging limit DLMh in the storage battery 105 are also taken into consideration, the peak-cut amount calculating section 14 simulates the increase in the charging power amount RC and the increase in the temporary peak-cut amount TPC through the charge of the storage battery 105 in such a manner that the temporary peak-cut amount TPC is maximized within a range in which the difference power DP is smaller than the chargeable power PCP and the charging power amount RC of the storage battery 105 does not exceed the charging limit CLMh. Moreover, the peak-cut amount calculating section 14 simulates the decrease in the charging power amount RC and the decrease in the temporary peak-cut amount TPC through the discharge of the storage battery 105 in such a manner that the temporary peak-cut amount TPC is minimized within a range in which the difference power DP is smaller than the dischargeable power PDP and the charging power amount RC of the storage battery 105 does not exceed the discharging limit DLMh.

Figure 3:
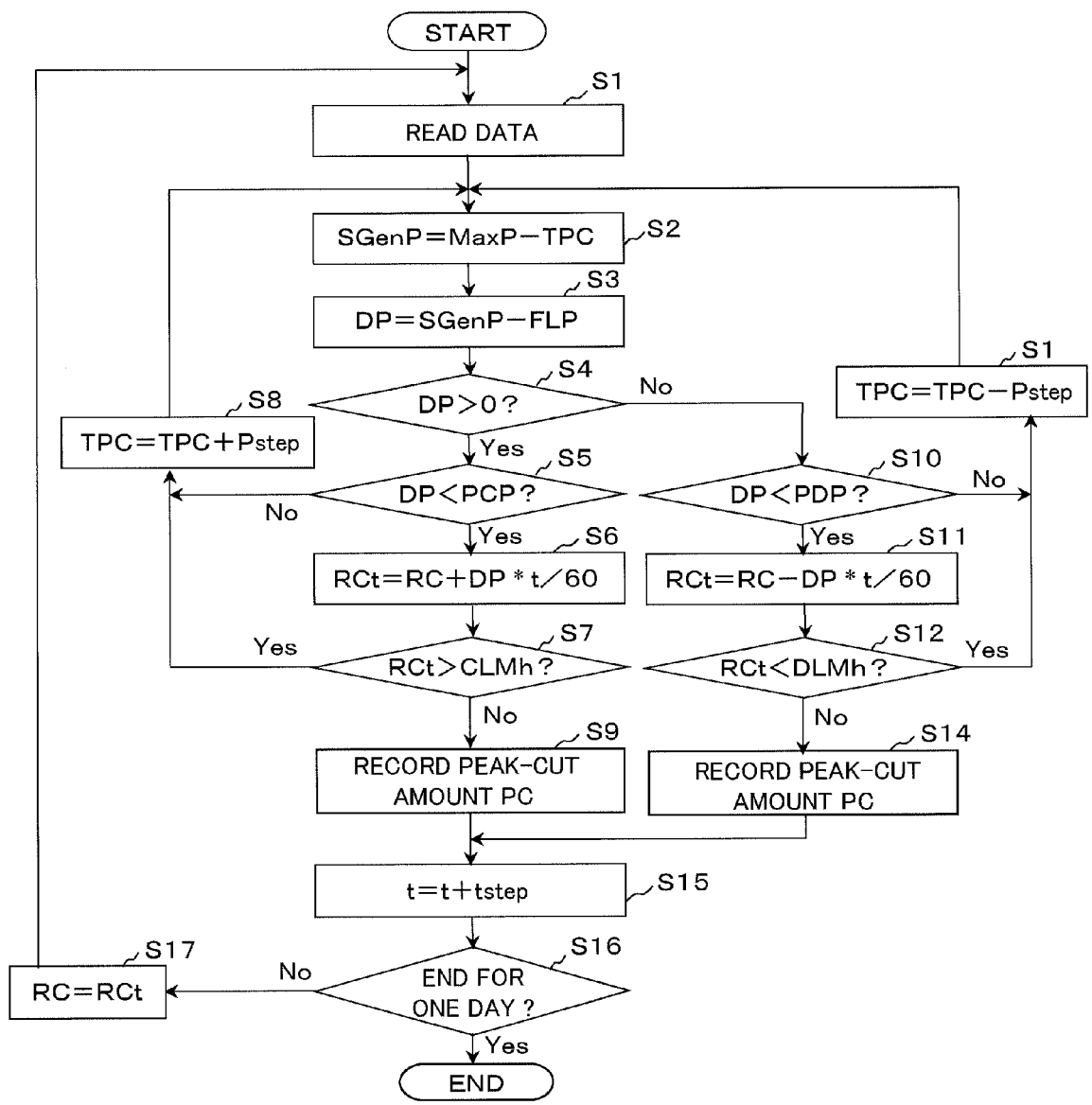
FIG. 3 is a flowchart showing an example of an operation of a simulation to be carried out by the peak-cut control device according to one or more embodiments.

Next, description will be given to an operation of the peak-cut control device 108 according to one or more embodiments of the present invention which has the structure described above. FIG. 3 is a flowchart showing an example of an operation of a simulation to be carried out by the peak-cut control device 108 according to one or more embodiments of the present invention. The flowchart illustrated in FIG. 3 is started when an operation for giving an instruction for starting the simulation is performed by a user.

In FIG. 3, the data reading section 11 of the peak-cut control device 108 reads demand prediction data representing a demand prediction power amount corresponding to one day of a next day from the demand prediction system 300 (Step S1). At this time, the peak-cut control device 108 initializes, to "1", a value of a read time t representing a value of a predetermined time (a minute unit) in execution of a simulation for one day.

Next, the planned power generation amount calculating section 12 calculates the planned power generation amount SGenP (=MaxP−TPC) in the wind power generation device 101 based on the maximum value MaxP of the consumed power for the next day which is specified based on the demand prediction data read by the data reading section 11 and the temporary peak-cut amount TPC which is temporarily set by the peak-cut amount calculating section 14 (Step S2). In an initial state, the temporary peak-cut amount TPC is set to have an optional value.

Furthermore, the difference power calculating section 13 calculates difference power DP (=SGenP−FLP) between the planned power generation amount SGenP obtained by the planned power generation amount calculating section 12 and the demand prediction power amount FLP at the predetermined read time t (at first t=1) which is specified based on the demand prediction data read by the data reading section 11 (Step S3). Then, the peak-cut amount calculating section 14 decides whether the difference power DP calculated by the difference power calculating section 13 has a positive value or not (Step S4).

If the difference power DP has the positive value, a charging simulation is carried out in Steps S5 to S9. First of all, the peak-cut amount calculating section 14 decides whether the difference power DP obtained by the difference power calculating section 13 is smaller than the chargeable power PCP of the storage battery 105 or not (Step S5).

If the difference power DP is smaller than the chargeable power PCP, the difference power DP can be charged to the storage battery 105. Accordingly, the peak-cut amount calculating section 14 carries out an operation for increasing the charging power amount RC of the storage battery 105 corresponding to the difference power DP (Step S6). Specifically, a charging power amount RCt at the read time t of the storage battery 105 is calculated by an operation of RCt=RC+DP*t/60. "t/60" is multiplied in order to covert a unit of the difference power DP from [kW] to [kWh].

The peak-cut amount calculating section 14 decides whether the charging power amount RCt at the read time t which is calculated as described above exceeds the charging limit CLMh of the storage battery 105 or not, that is, whether the value of the charging power amount RCt is greater than that of the charging limit CLMh or not (Step S7). If the charging power amount RCt exceeds the charging limit CLMh, a free space of the storage battery 105 is actually insufficient so that the charge cannot be carried out even if a condition of the chargeable power PCP is satisfied. Therefore, the peak-cut amount calculating section 14 increases the value of the temporary peak-cut amount TPC by a predetermined power amount Pstep (Step S8) and the processing returns to the Step S2.

If the peak-cut amount calculating section 14 decides that the difference power DP is not smaller than the chargeable power PCP of the storage battery 105 in the Step S5, similarly, the difference power DP cannot be charged to the storage battery 105. Also in this case, accordingly, the peak-cut amount calculating section 14 increases the value of the temporary peak-cut amount TPC by the predetermined power amount Pstep (Step S8) and the processing returns to the Step S2.

On the other hand, if the peak-cut amount calculating section 14 decides that the charging power amount RCt at the read time t does not exceed the charging limit CLMh of the storage battery 105 in the Step S7, the peak-cut amount calculating section 14 determines the temporary peak-cut amount TPC at that time as the peak-cut amount PC at the read time t and records the peak-cut amount PC in the peak-cut amount storing section 15 (Step S9). Then, the processing proceeds to Step S15.

As described above, if the difference power DP has the positive value, the peak-cut amount calculating section 14 simulates an increase in the charging power amount RCt and an increase in the temporary peak-cut amount TPC through the charge of the storage battery 105 in such a manner that the temporary peak-cut amount TPC is maximized within a range in which the difference power DP is smaller than the chargeable power PCP and the charging power amount RCt of the storage battery 105 does not exceed the charging limit CLMh at a certain read time t.

On the other hand, if the difference power DP does not have the positive value, a discharging simulation is carried out in Steps S10 to S14. First of all, the peak-cut amount calculating section decides whether the difference power DP obtained by the difference power calculating section 13 is smaller than the dischargeable power PDP of the storage battery 105 or not (Step S10).

If the difference power DP is smaller than the dischargeable power PDP, the difference power DP can be discharged from the storage battery 105. Accordingly, the peak-cut amount calculating section 14 carries out an operation for decreasing the charging power amount RC from the storage battery 105 corresponding to the difference power DP (Step S11). Specifically, a charging power amount RCt at the read time t of the storage battery 105 is calculated by an operation of RCt=RC−DP*t/60.

The peak-cut amount calculating section 14 decides whether the charging power amount RCt at the read time t which is calculated as described above exceeds the discharging limit DLMh of the storage battery 105 or not, that is, whether the value of the charging power amount RCt is smaller than that of the discharging limit DLMh or not (Step S12). If the charging power amount RCt exceeds the discharging limit DLMh, a residual charging amount of the storage battery 105 is actually insufficient so that the discharge cannot be carried out even if a condition of the dischargeable power PDP is satisfied. Therefore, the peak-cut amount calculating section 14 decreases the value of the temporary peak-cut amount TPC by a predetermined power amount Pstep (Step S13) and the processing returns to the Step S2.

If the peak-cut amount calculating section 14 decides that the difference power DP is not smaller than the dischargeable power PDP of the storage battery 105 in the Step S10, similarly, the difference power DP cannot be discharged from the storage battery 105. Also in this case, accordingly, the peak-cut amount calculating section 14 decreases the value of the temporary peak-cut amount TPC by the predetermined power amount Pstep (Step S13) and the processing returns to the Step S2.

On the other hand, if the peak-cut amount calculating section 14 decides that the charging power amount RCt at the read time t does not exceed the discharging limit DLMh of the storage battery 105 in the Step S12, the peak-cut amount calculating section 14 determines the temporary peak-cut amount TPC at that time as the peak-cut amount PC at the read time t and records the peak-cut amount PC in the peak-cut amount storing section 15 (Step S14). Then, the processing proceeds to Step S15.

As described above, if the difference power DP does not have the positive value, the peak-cut amount calculating section 14 simulates a decrease in the charging power amount RCt and a decrease in the temporary peak-cut amount TPC through the discharge of the storage battery 105 in such a manner that the temporary peak-cut amount TPC is minimized within a range in which the difference power DP is smaller than the dischargeable power PDP and the charging power amount RCt of the storage battery 105 does not exceed the discharging limit DLMh at a certain read time t.

In the Step S15, the peak-cut control device 108 advances the read time t by a predetermined time tstep (for example, one minute). Then, the peak-cut control device 108 decides whether the read time t reaches a value (t=1440) representing an end for one day or not (Step S16). If t=1440 is set, it is indicated that a simulation corresponding to one day is completed. Therefore, the processing in FIG. 3 is ended. On the other hand, if t=1440 is not set, RC=RCt is set (Step S17) and the processing returns to the Step S1.

Figure 4:
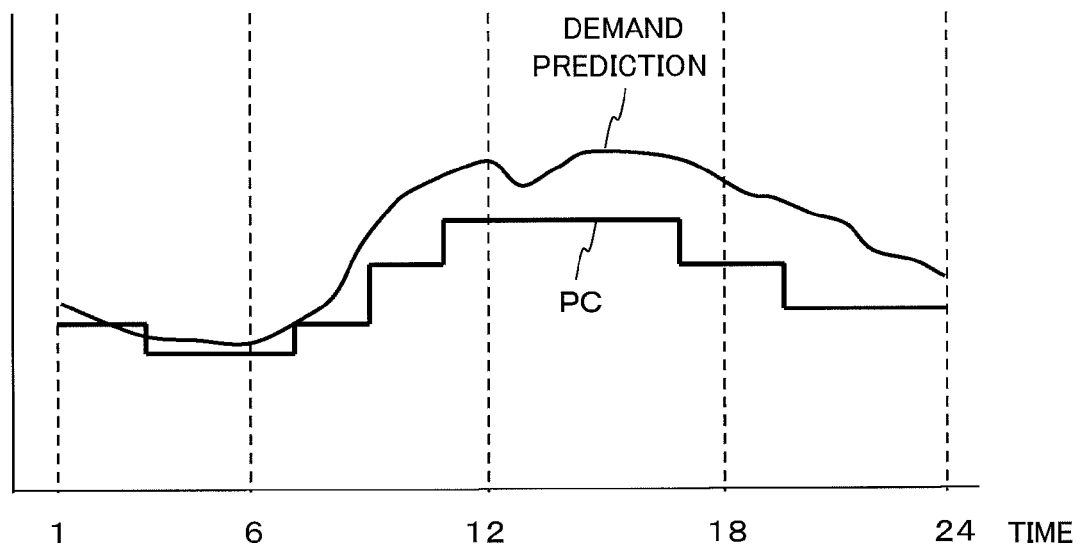
FIG. 4 is a graph showing an example of a peak-cut amount for one day which is obtained by the peak-cut control device according to one or more embodiments.

The peak-cut control device 108 executes the simulation every read time t to obtain the peak-cut amount PC for each predetermined time corresponding to one day (for each read time t) and to record the peak-cut amount PC in the peak-cut amount storing section 15. FIG. 4 is a graph showing an example of the peak-cut amount PC for one day which is obtained by the peak-cut control device 108.

Figure 5:
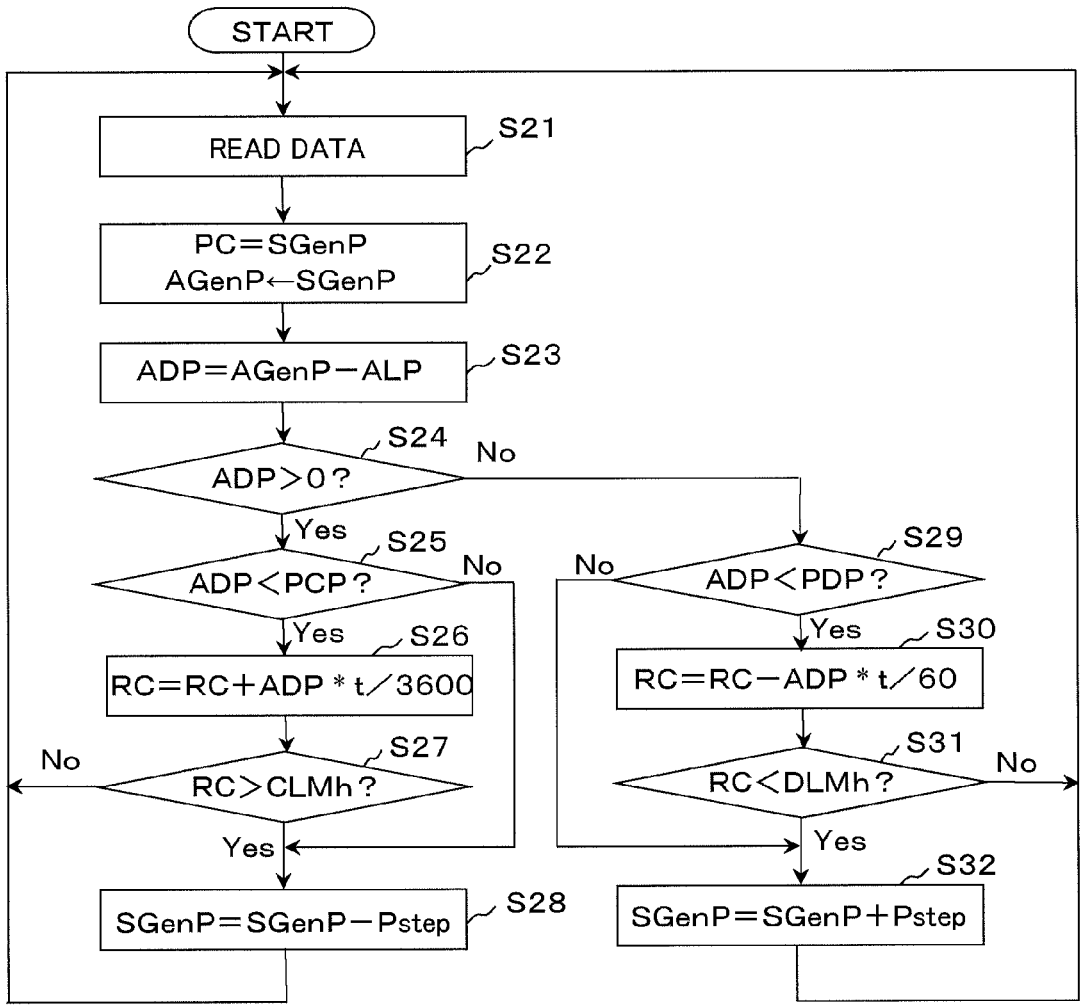
FIG. 5 is a flowchart showing an example of an operation of online control to be carried out by an online control device according to one or more embodiments.

FIG. 5 is a flowchart showing an example of an operation of online control to be carried out by the online control device 109 according to one or more embodiments of the present invention. The flowchart shown in FIG. 5 is started when an operation for giving an instruction for starting the online control is carried out by a user.

In FIG. 5, the online control device 109 reads the peak-cut amount PC obtained on a previous day by the peak-cut control device 108 from the peak-cut amount storing section 15 and reads demand prediction data representing a demand prediction power amount for that day from the demand prediction system 300 (Step S21).

Next, the online control device 109 sets the peak-cut amount PC read from the peak-cut amount storing section 15 as a planned power generation amount SGenP for that day and controls the windmill control device 102 in accordance with the planned power generation amount SGenP. Moreover, the online control device 109 regards, as an actual power generation amount AGenP of the wind power generation device 101, the planned power generation amount SGenP set as described above so as to be the power generation planned by the wind power generation device 101 (Step S22).

Then, the online control device 109 obtains the difference power ADP (=AGenP−ALP) between the actual power generation amount AGenP and a demand prediction power amount ALP at a present time which is read from the demand prediction system 300 (Step S23). Although the description has been given to the example in which the planned power generation amount SGenP is set to be the actual power generation amount AGenP, the power generation amount to be detected by the power generation amount meter 106 may be set to be the actual power generation amount AGenP.

The online control device 109 decides whether the difference power ADP obtained in the Step S23 has a positive value or not (Step S24). If the difference power ADP has the positive value, the actual power generation amount AGenP is excessive. Therefore, the storage battery 105 is charged in Steps S25 to S28. First of all, the online control device 109 decides whether the difference power ADP is smaller than the chargeable power PCP of the storage battery 105 or not (Step S25).

If the difference power ADP is smaller than the chargeable power PCP, the difference power ADP can be charged to the storage battery 105. Accordingly, the online control device 109 controls the charge/discharge control device 103 so as to charge the difference power ADP to the storage battery 105 (Step S26). Consequently, the charging power amount RC of the storage battery 105 is increased to have a value expressed in an operation of RC=RC+ADP*t/3600. Herein, "t/3600" is multiplied in order to convert the unit of the difference power ADP from [kW] to [kWh]. Differently from the simulation, "t/3600" is multiplied because the online control is carried out precisely (in high time resolution) on a second unit in place of a minute unit.

Next, the online control device 109 decides whether the charging power amount RC of the storage battery 105 after the charge exceeds the charging limit CLMh of the storage battery 105 or not, that is, whether the value of the charging power amount RC is greater than the value of the charging limit CLMh or not (Step S27). The charging power amount RC of the storage battery 105 is detected by the charging amount meter 107. If the charging power amount RC of the storage battery 105 does not exceed the charging limit CLMh, there is no particular problem related to the charge to the storage battery 105. For this reason, the processing returns to the Step S21 and the online control is continuously executed.

If it is decided that the difference power ADP is not smaller than the chargeable power PCP of the storage battery 105 in the Step S25, the difference power ADP cannot be charged to the storage battery 105. If it is decided that the charging power amount RC exceeds the charging limit CLMh in the Step S27, similarly, the difference power ADP cannot be charged to the storage battery 105 any more. In these cases, accordingly, the online control device 109 decreases the value of the planned power generation amount SGenP by the predetermined power amount Pstep (Step S28) and the processing returns to the Step S21.

In one or more embodiments of the present invention, however, such a peak-cut amount PC as to be maximized within a range in which the difference power DP is smaller than the chargeable power PCP and the charging power amount RC of the storage battery 105 does not exceed the charging limit CLMh is obtained by the simulation and the peak-cut amount PC is used as the planned power generation amount SGenP for that day. In most cases, therefore, the processing does not proceed to the Step S28.

Even if the power demand cannot be obtained as predicted and the actual difference power ADP is slightly different from the difference power DP in the simulation, it is possible to prevent the difference power ADP from being equal to or greater than the chargeable power PCP of the storage battery 105 or the charging power amount RC of the storage battery 105 from exceeding the charging limit CLMh. Consequently, it is possible to implement the peak cut by the charge to the storage battery 105 even if the power generation amount is not regulated under control of the windmill of the wind power generation device 101.

If it is decided that the difference power ADP does not have the positive value in the Step S24, the actual power generation amount AGenP is insufficient. For this reason, the discharge from the storage battery 105 is carried out in Steps S29 to S31. First of all, the online control device 109 decides whether the difference power ADP is smaller than the dischargeable power PDP of the storage battery 105 (Step S29).

If the difference power ADP is smaller than the dischargeable power PDP, it can be discharged from the storage battery 105. Accordingly, the online control device 109 controls the charge/discharge control device 103 so as to discharge the difference power ADP from the storage battery 105 (Step S30). Consequently, the charging power amount RC of the storage battery 105 is decreased to have such a value as to be expressed in RC=RC−ADP*t/3600.

Next, the online control device 109 decides whether the charging power amount RC of the storage battery 105 after the discharge exceeds the charging limit CLMh of the storage battery 105 or not, that is, whether the value of the charging power amount RC is smaller than the value of the discharging limit DLMh or not (Step S31). If the charging power amount RC does not exceed the discharging limit DLMh, there is no particular problem related to the discharge from the storage battery 105. For this reason, the processing returns to the Step S21 and the online control is continuously executed.

If it is decided that the difference power ADP is not smaller than the dischargeable power PDP of the storage battery 105 in the Step S29, the difference power ADP cannot be discharged from the storage battery 105. If it is decided that the charging power amount RC exceeds the discharging limit DLMh in the Step S31, similarly, the difference power ADP cannot be discharged from the storage battery 105 any more. In these cases, accordingly, the online control device 109 increases the value of the planned power generation amount SGenP by the predetermined power amount Pstep (Step S32) and the processing returns to the Step S21.

In one or more embodiments of the present invention, however, such a peak-cut amount PC as to be minimized within a range in which the difference power DP is smaller than the dischargeable power PDP and the charging power amount RC of the storage battery 105 does not exceed the discharging limit DLMh is obtained by the simulation and the peak-cut amount PC is used as the planned power generation amount SGenP for that day. In most cases, therefore, the processing does not proceed to the Step S28.

Even if the power demand cannot be obtained as predicted and the actual difference power ADP is slightly different from the difference power DP in the simulation, it is possible to prevent the difference power ADP from being equal to or greater than the dischargeable power PDP of the storage battery 105 or the charging power amount RC of the storage battery 105 from exceeding the discharging limit DLMh. Consequently, it is possible to implement the peak cut by the discharge from the storage battery 105 even if the power generation amount is not regulated under control of the windmill of the wind power generation device 101.

As described above in detail, in one or more embodiments of the present invention, there is obtained the difference power DP between the planned power generation amount SGenP determined based on the temporary peak-cut amount TPC and the demand prediction power amount which predicts the power demand for each predetermined time. The difference power DP thus obtained is compared with the chargeable power PCP or the dischargeable power PDP per unit time of the storage battery 105 every predetermined time to simulate the charge/discharge of the storage battery 105 and the increase/decrease in the temporary peak-cut amount TPC. Thus, the peak-cut amount PC for each predetermined time is obtained.

According to one or more embodiments of the present invention thus configured, the peak-cut amount PC is obtained in consideration of the chargeable power PCP or the dischargeable power PDP per unit time of the storage battery 105. Therefore, it is possible to obtain the peak-cut amount PC which makes the most of the chargeable power PCP or the dischargeable power PDP of the storage battery 105. In the actual online control after the simulation, therefore, it is possible to control power which is excessive or insufficient for an actual demand through the charge/discharge of the storage battery 105 by making the most of the charging/discharging ability per unit time of the storage battery 105. Consequently, it is possible to carry out peak-cut control of power without depending on a rotating machine of the wind power generation device 101 as much as possible.

In one or more embodiments of the present invention, moreover, the charging power amount RC of the storage battery 105 is compared with the charging limit CLMh or the discharging limit DLMh of the storage battery 105 every predetermined time to simulate the charge/discharge of the storage battery 105 and the increase/decrease in the temporary peak-cut amount TPC. Consequently, the peak-cut amount PC for each predetermined time is obtained.

According to one or more embodiments of the present invention thus configured, it is possible to obtain the peak-cut amount PC which makes the most of the capacity of the storage battery 105. In the actual online control after the simulation, therefore, it is possible to control power which is excessive or insufficient for an actual demand through the charge/discharge of the storage battery 105 by making the most of the capacity of the storage battery 105. Consequently, it is possible to carry out peak-cut control of power without depending on the rotating machine of the wind power generation device 101 as much as possible.

In one or more embodiments, the description has been given to the example in which both the comparison of the difference power DP with the chargeable power PCP or the dischargeable power PDP power unit time of the storage battery 105 and the comparison of the charging power amount RC of the storage battery 105 with the charging limit CLMh or the discharging limit DLMh are carried out to perform the simulation. Although only one of the former comparison and the latter comparison may be carried out, it is possible to perform both of the comparisons in order to execute the peak-cut control of the power by making the most of the storage battery 105 without depending on the rotating machine of the wind power generation device 101.

Although the description has been given to the example in which the peak-cut amount PC corresponding to one day of a next day is obtained by the simulation, the present invention is not restricted thereto. For example, it is also possible to obtain the peak-cut amount PC corresponding to one week of a next week.

Although the description has been given to the example in which the passage of the read time t in the simulation is marked on a minute unit, the numeral is only illustrative. Although the description has been given to the example in which the charge/discharge control in the online control is carried out on a second unit, the numeral is only illustrative.

Although the description has been given to the example in which the temporary peak-cut amount TPC is subtracted from the maximum value MaxP of the consumed power specified based on the demand prediction power amount data to obtain the planned power generation amount SGenP in the execution of the simulation, a way for obtaining the planned power generation amount SGenP is not restricted thereto. For example, it is also possible to obtain the planned power generation amount SGenP by a well-known method using a power generation prediction system for predicting a power generation amount based on a wind state for a next day or the like.

Although the description has been given to the example in which the chargeable power PCP and the dischargeable power PDP are set to have the fixed values, the present invention is not restricted thereto. For example, the chargeable power PCP may be caused to fluctuate depending on the charging power amount of the storage battery 105. Specifically, when the storage battery 105 is charged to the vicinity of the charging end, the chargeable power PCP is set to be smaller than a rated value. When the storage battery 105 is discharged to the vicinity of the discharging end, moreover, the dischargeable power PDP is set to be smaller than the rated value.

For example, in the case in which the chargeable power PCP is 2,000 kW in rating, the chargeable power PCP is set to be 2,000 kW according to the rating when the charging power amount is smaller than 90%. On the other hand, when the charging power amount is equal to or larger than 90% and is smaller than 95%, the chargeable power PCP is decreased to 1,000 kW, for example. In addition, the chargeable power PCP is decreased to 500 kW, for example, when the charging power amount is equal to or larger than 95% and is smaller than 100%, and the chargeable power PCP is set to be 0 kW when the storage battery 105 is fully charged.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims. Further, those of ordinary skill in the art would appreciate that certain "sections" described with respect to the above one or more embodiments may be implemented by a circuit or processor using known methods.

What is claimed is:

1. A peak-cut control device in a natural energy power generation system with a storage battery having a natural energy power generation device and a storage battery for charging/discharging a part of power generated by the natural energy power generation device, the peak-cut control device comprising:
   a difference power calculating section that calculates differential power between a planned power generation amount in the natural energy power generation device determined based on a temporary peak: cut amount and a demand prediction power amount that predicts a power demand for each predetermined time; and
   a peak-cut amount calculating section that calculates a peak-cut amount every predetermined time by:
      comparing the calculated differential power to chargeable power or dischargeable power per unit time of the storage battery; and
      simulating:
         charge of the differential power to the storage battery or discharge of the differential power from the storage battery; and
         an increase or decrease of the temporary peak-cut amount,
   wherein the peak-cut amount calculating section calculates the peak-cut amount every predetermined time by simulating:
      an increase of a charging power amount and the increase of the temporary peak-cut amount through the charge of the storage battery in such a manner that the temporary peak-cut amount is maximized within a range in which the difference power is smaller than the chargeable power, and
      a decrease of the charging power amount and the decrease of the temporary peak-cut amount through the discharge of the storage battery in such a manner that the temporary peak-cut amount is minimized within a range in which the difference power is smaller than the dischargeable power.

2. The peak-cut control device according to claim 1, wherein the peak-cut amount calculating section simulates:

an increase in a charging power amount and the increase in the temporary peak-cut amount through the charge of the differential power to the storage battery so that the temporary peak-cut amount is maximized within a range in which a charging power amount of the storage battery does not exceed a charging limit, and a decrease in the charging power amount and the decrease in the temporary peak-cut amount through the discharge of the differential power from the storage battery so that the temporary peak-cut amount is minimized within a range in which the charging power amount of the storage battery does not exceed a discharging limit in place of the simulation according to claim 1.

3. The peak-cut control device according to claim 1, wherein the peak-cut amount calculating section simulates:

an increase in a charging power amount and the increase in the temporary peak-cut amount through the charge of the differential power to the storage battery so that the temporary peak-cut amount is maximized within a range in which the differential power is smaller than the chargeable power and the charging power amount of the storage battery does not exceed a charging limit, and a decrease in the charging power amount and the decrease in the temporary peak-cut amount through the discharge of the differential power from the storage battery so that the temporary peak-cut amount is minimized within a range in which the differential power is smaller than the dischargeable power and the charging power amount of the storage battery does not exceed a discharging limit in place of the simulation according to claim 1.

\* \* \* \* \*